Sept. 8, 1936.    W. BÄSELER ET AL    2,054,027
DEVICE FOR THE CHANGING OF SWITCHES
Filed July 26, 1930
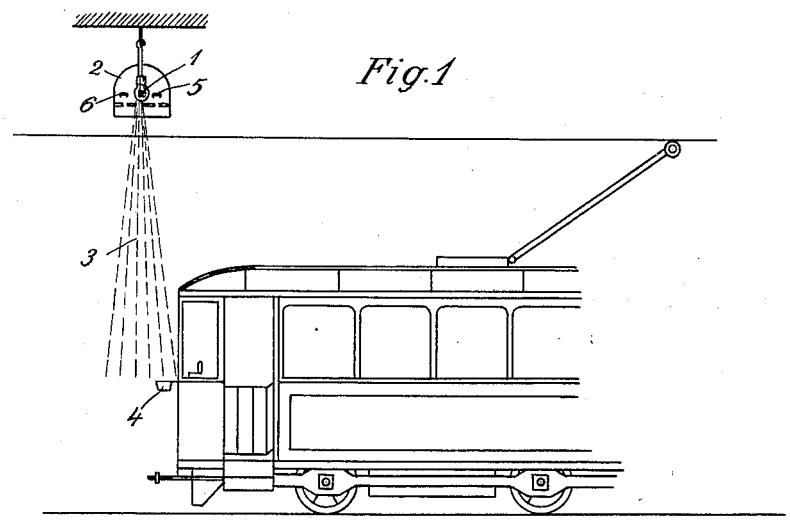
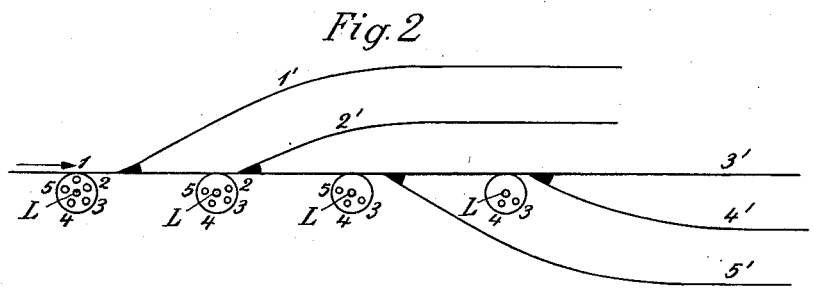
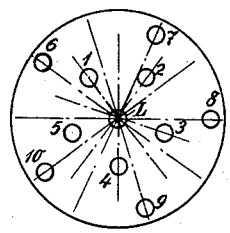
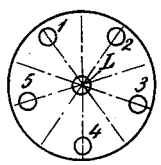
Inventors:
Wolfgang Bäseler
and Karl Schieck
by
Attorney Patented Sept. 8, 1936

2,054,027

UNITED STATES PATENT OFFICE 2,054,027

DEVICE FOR THE CHANGING OF SWITCHES

Wolfgang Bäseler, Munich, and Karl Schieck, Frankfort-on-the-Main, Germany, assignors, by mesne assignments, to The Lamson Company, Syracuse, N. Y., a corporation of Massachusetts Application July 26, 1930, Serial No. 471,069
In Germany July 26, 1929

10 Claims. (Cl. 246—29)

We have filed an application in Germany July 26, 1929.

Devices have already become known, for instance with electric tramways, by means of which track points or switches are shifted from the vehicle. These arrangements operate with the aid of an overhead line contact, through which current must be passed when a switch is to be shifted. This method, however, is not satisfactory, for frequently the passing of the current is incompatible with the working conditions, for instance, if there is a switch on a gradient.

The present invention provides for the automatic shifting of switches from the vehicle at any time irrespective of the traffic and working conditions.

Some embodiments of the arrangement according to the invention are shown in the drawing by way of example.

Figure 1 is an elevation.

Figure 2 is a plan of some tracks in a shunting yard.

Figure 3 shows diagrammatically the arrangement of the receivers.

Figure 4 is another diagrammatic view of a different arrangement of the cells, and Figure 5 is an elevation showing the arrangement of the mirror.

Referring to the drawing, Figure 1 shows, how at a short distance from the switch to be shifted over, an optical device 2, containing a source of light 1 and the photo-electric cells 5 and 6, is arranged above the vehicle in such a manner, that the portion of the car on which is mounted the reflector 4 (for instance a triplex mirror), will move through the cone of light 3 of the source of light 1. The said triplex mirror is a tetrahedral mirror which will reflect the rays of light emanating from a source of light upon a receiver arranged as closely to the source of light as possible. Preferably such source of light is suspended above the track, in order to offer no obstacle to the traffic. The mirror 4 is mounted on the vehicle in such a way that it can be actuated by the driver at any time. If now said mirror comes into the path of the cone of light emanating from the source of light, the rays of light will be reflected, for instance to the photo-electric cell arranged adjacent to the source of light. In consequence of this exposure to light the said cell will close a circuit which will be employed for the operation of the switch. If a car approaches a switch and it is not desired to shift said switch, it will suffice if the mirror is either covered with a flap or the like or turned to such an extent that the reflected rays of light will not impinge upon the cell 5.

The arrangement described will suffice for a switch with two tracks and in this instance it could be rendered simpler in so far as the source of light 1 might be arranged on the vehicle proper throwing the rays of light directly upon the photo-electric cell. If it is desired however to operate a switch having several tracks, for instance three, it is suitable to arrange the cell 6 besides the cell 5. In this manner it is possible to obtain a selective adjustment of the switch to the right, left or central track. It is only necessary for that purpose to turn the mirror 4 through the same angular distance, by which the selenium cells located around the source of light, are distanced from each other.

A further embodiment is illustrated in Figure 2, representing a starting plant in a shunting yard, in which ahead of each of the four switches a source of light L is provided, close to which a plurality of photo-electric cells are arranged. Said arrangement has for its purpose an automatic adjustment of the prescribed track by means of the reflecting device arranged on the vehicle, during the starting of the cars. On each car is mounted a triplex mirror, reflecting the rays of light coming from the source of light L. The said mirror can be adjusted so often as there are tracks to be selected.

If for instance one of the cars is to be shunted to the track 3', the triplex mirror mounted thereon is adjusted in such a manner, that the rays of light reflected by said mirror will impinge on the photo-electric cell 3. If the first switch is to be adjusted to the track 1', the exposure of the cell 3 of the reflecting device arranged ahead of said switch, will effect a shifting to the track 3'. When the car arrives at the second switch the way to the track 3' will be set free by the further reflected and impinging rays of light. While traveling over the tracks 4' and 5' the same occurrence is repeated. It is obvious that in this manner each vehicle will always adjust its switches accurately.

Figure 3 shows how the receivers 1 to 5 are arranged adjacent the source of light L. According to this design the cells arranged ahead of each switch are grouped about the source of light L; the number of cells arranged about the source of light corresponding to the number of switches to be operated from a vehicle. If, for instance, as shown in Fig. 2, five tracks exist, the first electric light transmitting and receiving arrangement must possess five light receivers or cells numbered 1 to 5 in order that the vehicle arriving in the direction of the arrow can, before passing the first switch, correctly adjust all five switches. If, for instance, the vehicle is supposed to pass onto track 4', the reflector will have to throw its light upon cell 4, producing thereby the automatic adjustment of the said track 4'.

In case there are so many vehicles available that it is no longer possible to group all the cells about the source of light, it is of advantage to arrange the said cells in two or more concentric rows about the source of light L, as shown in Figure 4.

On the inner circle there are arranged the photo-electric cells or receivers 1 to 5 and on the outer circle the cells 6 to 10. In order to ensure that the reflected rays of light will impinge either on the inner or outer circle, two kinds of mirrors having two different azimuths are employed. If there are more tracks to be considered the selenium cells grouped in two rows may be operated by two mirrors mounted on the vehicle adjacent one another, which will always reflect the light to two selenium cells, one cell in each of the respective circles. It is possible in this way and with reference to Figure 4 to select by a combination 5×5=25 tracks with ten cells only. Preferably in this event both mirrors are arranged in a common mounting.

In order to make sure that the reflected light rays will selectively operate either of the cells 1 to 5 and 6 to 10 arranged upon the two concentric circles, the reflecting device upon the vehicle must be constructed or arranged accordingly. The construction might be such that one of the surfaces of the triplex mirror is adjustable in two different positions, and that the light rays of one position would operate cells 1 to 5, while the light rays of the other position would operate the remaining cells 6 to 10. As, however, adjustable surfaces are the frequent cause of inaccuracies it is advisable to employ two mirrors having two different azimuths. For example prisms made of ground glass can be used instead of triplex mirrors. One of the mirrors then serves to operate cells 1 to 5, while the other one serves to actuate cells 6 to 10. In case the number of switches to be adjusted is so large that a corresponding number of light electric cells can not safely be arranged around the same source of light (if too close together two cells may be actuated by the same light ray), then the effects of both mirrors having different azimuths can be combined, so that two cells are always operated by the mirrors at the same time. In this manner it is possible to actuate by means of the electric light transmitting and receiving arrangement illustrated in Fig. 4, i. e., by means of only 10 cells, 5 times 5 or 25 different switches, from one place. Preferably both of the mirrors are arranged in a common mounting.

Figure 5 shows the arrangement of the triplex mirrors at the foot of a lantern, as such are used by the shunting service in general for giving light signals. By this it is possible to operate by hand every switch actuated by photo-electric cells. Obviously the mirror may also be employed alone without the necessity of mounting or attaching it in any way. This will obviate the mounting of mirrors on each individual vehicle.

The arrangement according to the invention extends not only to the embodiments mentioned, but it is also possible to properly adjust all switches on a section of track from one and the same spot.

This may be even of advantage, if the switches are in close proximity where the arrangement of the reflectors and the photo-electric cells will offer inconveniences. As a matter of course, it comes also within the scope of the present invention to arrange a source of light ahead of the first switch only and to allot to it so many cells as there are tracks. The adjustment of the remaining switches may be effected then advantageously by means of relays, operating in relative dependency and being actuated through the influencing of the cell corresponding to the respective track.

The mounting of the triplex mirror on the vehicle may be done either by attaching it to a corresponding device or it is secured to an iron part of the vehicle by means of a permanent magnet.

We claim:

1. A device for shifting switches of the character described comprising in combination a source of light, means for reflecting rays emanating from said source of light, a photo-electric receiver arranged adjacent to a switch and means influenced by said receiver for automatically adjusting the said switch, said reflecting means consisting of a triplex mirror and adapted to be adjusted to operate selected switches.

2. A device for shifting switches of the character described comprising in combination a source of light, means for reflecting rays emanating from said source of light, a photo-electric receiver arranged close to the switch, menas for automatically adjusting the said switch and means for covering the reflecting device for the purpose of rendering the said adjusting means inoperative.

3. A device for shifting switches of the character described comprising in combination a source of light, means for reflecting rays emanating from said source of light, a photo-electric receiver arranged close to the switch, means for automatically adjusting the said switch and means for turning the reflecting means for the purpose of rendering the said adjusting means inoperative.

4. A device for shifting switches of the character described comprising in combination a source of light, two triplex mirrors adapted to reflect rays emanating from said source of light and having different azimuths, a photo-electric receiver arranged close to the switch and means for automatically adjusting the said switch.

5. A device for shifting switches of the character described comprising in combination a source of light, a plurality of triplex mirrors adapted to reflect the rays emanating from the said source of light and having different azimuths, a photo-electric receiver arranged close to the switch and means for automatically adjusting the said switch.

6. A device for shifting switches of the character described comprising in combination a source of light, means for reflecting rays emanating from said source of light, photo-electric receivers arranged close to the switch and arranged on concentric circles about the said source of light and means for automatically adjusting the said switch.

7. A device for shifting switches of the character described comprising in combination a source of light, a plurality of triplex mirrors adapted to reflect the rays emanating from said source of light, a plurality of photo-electric receivers arranged about the source of light, a selected number of said receivers receiving the reflected rays of each triplex mirror, and means influenced by each receiver for automatically operating a switch.

8. A device for shifting switches of the character described comprising in combination a source of light, a plurality of triplex mirrors adapted to reflect the rays emanating from said source of light, a plurality of photo-electric receivers arranged in concentric circles about the source of light, the separate receivers arranged in a circle being adapted to receive the reflected rays of a mirror, and means influenced by each receiver for automatically operating a switch.

9. A device for shifting switches of the character described comprising in combination a source of light, means movable into at least two positions for reflecting rays emanating from said source of light, a photo-electric receiver arranged adjacent a switch and onto which the rays may be reflected by said movable means when in one of said positions, means set in operation by said receiver when the rays are reflected thereon for shifting a switch and means for turning said reflecting means into the other of said positions whereby the rays are not reflected onto the receiver and the switch shifting means are inoperative.

10. A device for shifting switches of the character described comprising in combination a source of light, means movable into at least two positions for reflecting rays emanating from said source of light, a photo-electric receiver arranged adjacent a switch and onto which the rays may be reflected by the movable means when in one of said positions and means set in operation by said receiver when the rays are reflected thereon for shifting the switch whereby the switch shifting means are operative when the movable means are in one of said positions and are inoperative when the movable means are in the other of said positions.

WOLFGANG BÄSELER.
KARL SCHIECK.